(12) United States Patent
Bang

(10) Patent No.: US 7,077,005 B2
(45) Date of Patent: *Jul. 18, 2006

(54) ADJUSTABLE MEASURING DEVICE AND METHOD

(76) Inventor: Judith M. Bang, 5116 W. 60th St., Minneapolis, MN (US) 55402-1498

( * ) Notice: Subject to any disclaimer, the term of this patent is extended or adjusted under 35 U.S.C. 154(b) by 0 days.

This patent is subject to a terminal disclaimer.

(21) Appl. No.: 11/189,031

(22) Filed: Jul. 25, 2005

(65) Prior Publication Data

US 2006/0016257 A1 Jan. 26, 2006

Related U.S. Application Data

(63) Continuation of application No. 10/914,535, filed on Aug. 9, 2004, now Pat. No. 6,948,366.

(60) Provisional application No. 60/494,177, filed on Aug. 11, 2003.

(51) Int. Cl.
*G01F 19/00* (2006.01)
(52) U.S. Cl. ...................................................... 73/429
(58) Field of Classification Search .................. 73/429, 73/427
See application file for complete search history.

(56) References Cited

U.S. PATENT DOCUMENTS 4,488,432 A 12/1984 Bang
6,026,685 A 2/2000 Weterrings et al.

OTHER PUBLICATIONS

Milmour Products, Inc. "Innovative Promotional Plastic Products", p. 15 entitled "Baker's "Wonder" Cup".

*Primary Examiner*—Harshad Patel
(74) *Attorney, Agent, or Firm*—Dorsey & Whitney LLP

(57) ABSTRACT

A measuring device and method for measuring a volume of a gel-like, powder-like or liquid-like material is provided by defining a desired volume of the material, moving a peripheral measuring edge of a longitudinal inner member along an inside wall of a longitudinal outer member to the desired volume corresponding to an indicator indicated at one of a plurality of measurement positioning stops, filling the material in the longitudinal outer member on top of the longitudinal inner member, moving the peripheral measuring edge of the longitudinal inner member to a second measurement positioning stop, and releasing the material out of the longitudinal outer member.

2 Claims, 1 Drawing Sheet

ADJUSTABLE MEASURING DEVICE AND METHOD

CROSS-REFERENCE TO RELATED APPLICATION

This application is a continuation of U.S. Ser. No. 10/914,535, filed on Aug. 9, 2004, now U.S. Pat. No. 6,948,366 entitled "Adjustable Measuring Device and Method", which claims priority to U.S. provisional patent application No. 60/494,177, filed Aug. 11, 2003; the subject matter of which both are incorporated herein by reference.

FIELD OF THE INVENTION

The present invention relates generally to a measuring device and method, and more particularly, to an adjustable measuring device and method for measuring a precise amount of material and readily releasing the material from the measuring device.

BACKGROUND OF THE INVENTION

Measuring devices, such as measuring cups, have been known for a long time. An adjustable measuring device, such as the one disclosed in U.S. Pat. No. 4,488,432, issued to the same inventor, is incorporated herewith by reference. It is desirable to have an improved adjustable measuring device and method for measuring a precise amount of material as well as readily releasing the material from the measuring device.

SUMMARY OF THE INVENTION

The present invention provides an improved adjustable measuring device with enhanced measuring precision and material releasing capability.

In one embodiment of the present invention, an adjustable measuring device for measuring and releasing a volume of a gel-like, powder-like, and liquid-like material, comprises a longitudinal outer member and a longitudinal inner member sliding along an inside wall of the longitudinal outer member. A plurality of measurement positioning stops or lugs disposed on the inside wall of the longitudinal outer member. The stops represent a variety of measurement units.

Still in one embodiment, the longitudinal inner member comprises a peripheral measuring edge projecting from a first peripheral edge of the longitudinal inner member and a peripheral extension member projecting from a second peripheral edge of the longitudinal inner member.

Further in one embodiment, the peripheral measuring edge is positioned at each of the stops for measuring the volume of the material. The peripheral extension member engages with the inner wall of the longitudinal outer member and is made of a material firm enough to fit between the stops for measurement and also flexible enough to smoothly move along the inner wall of the longitudinal outer member. Accordingly, the extra residual material disposed on the inside wall of the longitudinal outer member is squeezed and released by the peripheral extension member of the longitudinal inner member. Therefore, a precise amount of material is measured and released from the measuring device.

In one embodiment of the present invention, a method of measuring a volume of a gel-like, powder-like or liquid-like material comprises the steps of: defining a desired volume of the material; moving a peripheral measuring edge of a longitudinal inner member along an inside wall of a longitudinal outer member to the desired volume corresponding to an indicator indicated at one of a plurality of measurement positioning stops; filling the material in the longitudinal outer member on top of the longitudinal inner member; moving the peripheral measuring edge of the longitudinal inner member to a second measurement positioning stop; and releasing the material out of the longitudinal outer member.

In one embodiment, the indicators represent different volumes of the material, such as 2 cups, ½ cup, or other measuring units.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION OF THE PREFERRED EMBODIMENTS

Figure 1:
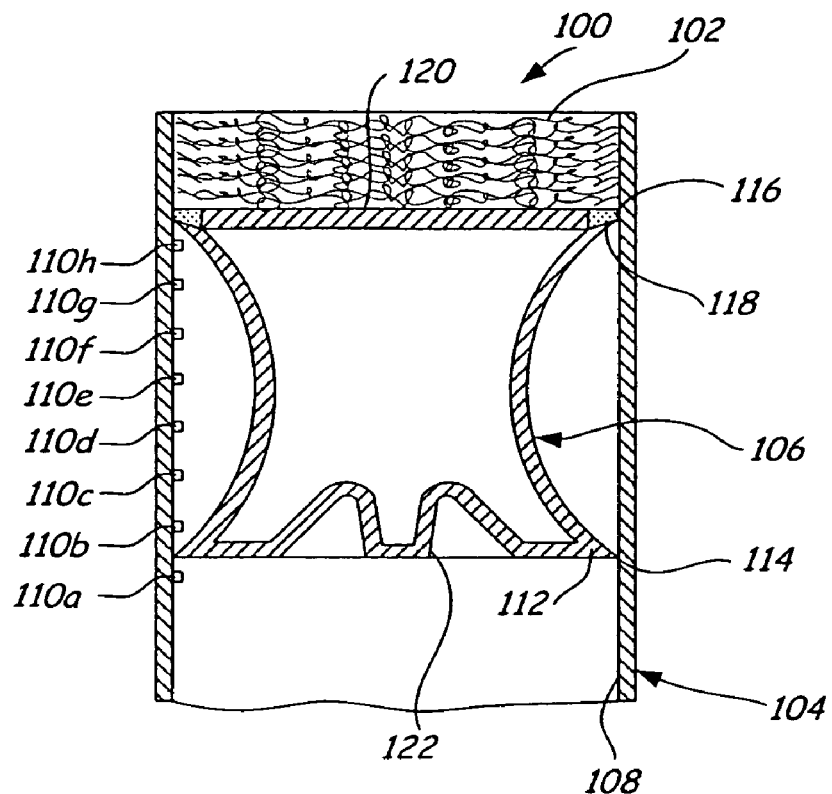
FIG. 1 illustrates a cross-sectional view of one embodiment of an adjustable measuring device in accordance with the principles of the present invention.

The present invention provides an improved adjustable measuring device with enhanced measuring precision and material releasing capability. In FIG. 1, one embodiment of an adjustable measuring device 100 is provided to measure and release a volume of a gel-like, powder-like, and liquid-like material 102. The measuring device 100 includes a longitudinal outer member 104 and a longitudinal inner member 106 sliding along an inside wall 108 of the longitudinal outer member 104. A plurality of measurement positioning stops or lugs 110a–110h disposed on the inside wall 108 of the longitudinal outer member 104. The stops or lugs 110a–110h represent a variety of measurement stats, e.g. 2½ cups 110a, 2 cups 110b, 1½ cups 110c, 1 cup 110d, ½ cup 110e, ⅓ cup 110f, ¼ cup 110g, and 0 cup (i.e. release stop or lug) 110h. It is appreciated to a person skilled in the art that any other suitable measuring units can be used within the scope of the present invention.

Figure 2:
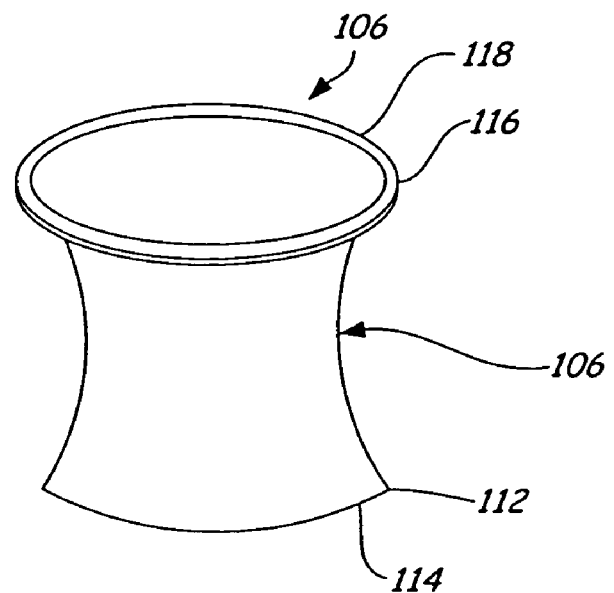
FIG. 2 illustrates a perspective view of one embodiment of a longitudinal inner member of an adjustable measuring device in accordance with the principles of the present invention.

In FIGS. 1 and 2, the longitudinal inner member 106 includes a peripheral measuring edge 112 projecting from a first peripheral edge 114 of the longitudinal inner member 106 and a peripheral extension member 116 projecting from a second peripheral edge 118 of the longitudinal inner member 106.

In FIG. 1, the peripheral measuring edge 112 is positioned at each of the stops 110a–110h for measuring the volume of the material 102. The peripheral extension member 116 engages with the inner wall 108 of the longitudinal outer member 104 and is made of a material firm enough to fit between the stops for measurement and also flexible enough to smoothly move along the inner wall 108 of the longitudinal outer member 104. Accordingly, the extra residual material disposed on the inside wall 108 of the longitudinal outer member 104 is squeezed and released by the peripheral extension member 112 of the longitudinal inner member 106. Therefore, a precise amount of material is measured and released from the measuring device 100.

In operation of the present invention, a user first decides a desired volume of a gel-like, powder-like or liquid-like material to be measured, then moves the peripheral measuring edge 116 of the longitudinal inner member 106 along the inside wall 108 of the longitudinal outer member 104 to the desired volume corresponding to an indicator at one of the plurality of measurement positioning stops or lugs 110a–110g; filling the material 102 in the longitudinal outer member 104 on top 120 of the longitudinal inner member 106; moving the peripheral measuring edge 114 of the longitudinal inner member 106 to a second measurement positioning stop or lug 110b–110h; and releasing the material 102 out of the longitudinal outer member 104.

The indicators represent different volumes of the material 102, such as 2 cups, ½ cup, or any other measuring units as discussed above.

The longitudinal inner member 106 also includes a grip or handle portion 122 for the user to grip, pull and/or push the longitudinal inner member 106 along the inner wall 108 of the longitudinal outer member 104 of the device 100, as well as to rotate the longitudinal inner member 106 in and out of the various stops or lugs 110a–110h.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

The invention claimed is:

1. A method of measuring a volume of material, comprising the steps of:
    providing an adjustable measuring device which includes:
        a longitudinal outer member;
        a longitudinal inner member capable of sliding along and rotating an inside wall of the longitudinal outer member;
        a plurality of measurement positioning stops disposed on the inside wall of the longitudinal outer member, wherein the stops represent a variety of measurement units;
    wherein the longitudinal inner member includes a peripheral measuring edge projecting from a first peripheral edge of the longitudinal inner member, a peripheral extension member projecting from a second peripheral edge of the longitudinal inner member, and a handle portion for a user to slide the longitudinal inner member along the inside wall and rotate the longitudinal inner member in and out of the stops; and
    wherein the peripheral extension member engages with the inner wall of the longitudinal outer member and is made of a material firm enough to fit between the stops for measurement and also flexible enough to smoothly slide along and rotate within the inside wall of the longitudinal outer member;
    filling the material on top of the longitudinal inner member within the inside wall of the longitudinal outer member;
    moving the longitudinal inner member from the first stop to the second stop along the inside wall of the longitudinal outer member; and
    rotating and sliding the handle portion of the longitudinal inner member along the inside wall, whereby the volume of the material is measured and moved out of the measuring device.

2. The method of claim 1, further comprising the step of squeezing and moving extra residual material disposed on the inside wall of the longitudinal outer member out of the longitudinal outer member by the peripheral extension member of the longitudinal inner member, whereby a precise amount of material is measured.

* * * * *